United States Patent
Chen et al.

(10) Patent No.: US 9,582,069 B2
(45) Date of Patent: Feb. 28, 2017

(54) ELECTRONIC APPARATUS AND WAKE-UP METHOD THEREOF

(71) Applicant: Acer Incorporated, New Taipei (TW)

(72) Inventors: Kuan-Yu Chen, New Taipei (TW); Shu-Chun Liao, New Taipei (TW); Ching-Ho Tsai, New Taipei (TW)

(73) Assignee: Acer Incorporated, New Taipei (TW)

( * ) Notice: Subject to any disclaimer, the term of this patent is extended or adjusted under 35 U.S.C. 154(b) by 161 days.

(21) Appl. No.: 14/583,181

(22) Filed: Dec. 25, 2014

(65) Prior Publication Data

US 2016/0132098 A1 May 12, 2016

(30) Foreign Application Priority Data

Nov. 12, 2014 (TW) .............................. 103139205 A

(51) Int. Cl.
*G06F 1/32* (2006.01)
*G06F 13/24* (2006.01)

(52) U.S. Cl.
CPC .............. *G06F 1/3296* (2013.01); *G06F 13/24* (2013.01)

(58) Field of Classification Search
CPC .................. G06F 1/24; G06F 1/3296
USPC ........................................................ 713/323
See application file for complete search history.

(56) References Cited

U.S. PATENT DOCUMENTS

| 7,260,729 B2 * | 8/2007 | Araki | .................... G06F 1/3203 713/300 |
| 2013/0346737 A1 | 12/2013 | Yu et al. | |
| 2015/0015380 A1 * | 1/2015 | Choi | ..................... G08C 17/02 340/12.22 |

FOREIGN PATENT DOCUMENTS

| TW | 201023580 | 6/2010 |
| TW | I417710 | 12/2013 |

* cited by examiner

*Primary Examiner* — Vincent Tran
(74) *Attorney, Agent, or Firm* — Jianq Chyun IP Office

(57) ABSTRACT

An electronic apparatus having an input unit and a network card and a wake-up method thereof are provided. In the method, an input event triggered by the input unit is received. Next, whether the electronic apparatus is in a partial wake-up mode entered after being woken up by the network card is determined. Then, the electronic apparatus is woken up to a normal operation mode if the electronic apparatus is in the partial wake-up mode.

8 Claims, 3 Drawing Sheets

ELECTRONIC APPARATUS AND WAKE-UP METHOD THEREOF

CROSS-REFERENCE TO RELATED APPLICATION

This application claims the priority benefit of Taiwan application serial no. 103139205, filed on Nov. 12, 2014. The entirety of the above-mentioned patent application is hereby incorporated by reference herein and made a part of this specification.

BACKGROUND OF THE INVENTION

1. Field of the Invention

The invention relates to an electronic apparatus and a wake-up method thereof, and more particularly, relates to an electronic device woken up by a network card and a wake-up method thereof.

2. Description of Related Art

In recent years, along with evolving computer technology, remote control technology becomes increasingly common. A user may operate a computer remotely through the Internet at any time. For example, a typical user may operate a computer system at an office from home by using remote control, so as to obtain required data or perform remote operations. A system administrator may further use remote control to obtain hardware status, system event log records and the like information of a remote computer to understand the status of a computer system at any time.

Computer systems nowadays typically have a network card supporting a Wake on LAN (WOL) function, and may execute a wake-up event after receiving a wake-up request from another remote computer by using the network card. Since a partial wake-up mode is entered after being woken up by a network card, under such a mode the computer system is allowed for remote data access only, and a part of the equipments (for example, a screen, a speaker, a CD-ROM and the like) is still in a sleep state or a shutdown state for saving power and preventing noise.

For example, referring to TABLE 1, the states of a computer include a partial wake-up state corresponding to aforesaid partial wake-up mode, a display off state, a sleep state, a hibernate state, and a shutdown state. The outcomes of executing the wake-up events triggered by input units corresponding to different states are different. For example, in the above partial wake-up state, since a part of the components are still in a sleep or shutdown state, a user may mistakenly determine that the computer is still in a sleep state and perform a wake-up behavior such as pressing the power button, keying on the keyboard or clicking on the mouse. That is to say, when the computer is under the partial wake-up mode, if a user presses the power button, the computer will execute the event corresponding to the power button (for example, hibernate, sleep or shutdown and the like). Accordingly, this will cause a result unexpected by the user.

TABLE 1

| State | Input Device | | |
|---|---|---|---|
| | Power Button | Keyboard | Mouse |
| Partial Wake-Up State | Event corresponding to power button | Display On | Not Applicable |
| Display Off State | Event corresponding to power button | Display On | Applicable |
| Sleep State | Wake up to normal mode | Wake up to normal mode | Wake up to normal mode |
| Hibernate State | Wake up to normal mode | Not Applicable | Not Applicable |
| Shutdown State | Wake up to normal mode | Not Applicable | Not Applicable |

In summary, how to solve the problem of being unable to wake up the electronic apparatus that is in a partial wake-up mode to a normal operating state through the wake-up events, such as pressing the power button, keying on the keyboard or clicking on the mouse, is a goal dedicated by those skilled in the art in the technical field.

SUMMARY OF THE INVENTION

The invention provides an electronic apparatus and a wake-up method thereof, capable of effectively waking up an electronic apparatus already being woken up by a network card, to a normal operating mode via an input event.

The invention provides a wake-up method of an electronic apparatus having an input unit and a network card. In the method, an input event triggered by the input unit is received. Whether the electronic apparatus is in a partial wake-up mode entered after being woken up by the network card is determined. The electronic apparatus is woken up to a normal operating mode if the electronic apparatus is in the partial wake-up mode.

The invention provides an electronic apparatus including a network card, an input unit, a storage unit and a processor. The storage unit stores a plurality of modules. The processor is coupled to the network card, the input unit and the storage unit, and used for loading and executing the modules stored in the storage unit. The modules include an input event filtering module and a wake-up module. The input event filtering module receives an input event triggered by the input unit, and the wake-up module determines whether the electronic apparatus is in a partial wake-up mode entered after being woken up by the network card and wakes up the electronic apparatus to a normal operating mode if the electronic apparatus is in the partial wake-up mode.

Based on the above, the electronic apparatus and a wake-up method thereof of the invention determines whether the electronic apparatus has already been woken up by the network card after receiving an input event so as to correctly wake-up the electronic apparatus to a normal operating mode, thus preventing a result not expected by the user.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
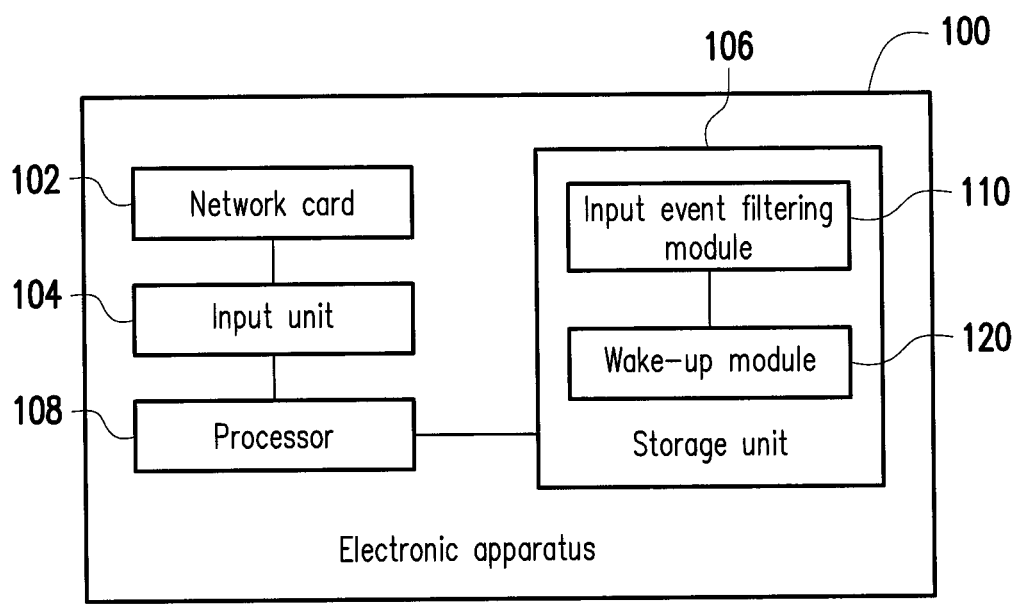
FIG. 1 is a block diagram illustrating an electronic apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

To solve the problem of being unable to wake-up the electronic apparatus that is in a partial wake-up mode to a normal operating state through wake-up behaviors such as pressing the power button, keying on the keyboard or clicking on the mouse, the invention allows the user to obtain expected results by determining whether the electronic apparatus has already been woken up by the network card to correctly wake up the electronic apparatus to a normal operating mode after receiving an input event. Based on the above, user experience on operating an electronic apparatus is effectively improved.

FIG. 1 is a block diagram illustrating an electronic apparatus according to an embodiment of the invention.

Referring to FIG. 1, an electronic apparatus 100 includes a network card 102, an input unit 104, a storage unit 106 and a processor 108. In the present embodiment, the electronic apparatus 100 may be a personal computer, a notebook computer and the like, but is not limited thereto.

The network card 102 is, for example, a wireless network card that supports the Institute of Electrical and Electronics Engineers (IEEE) and the like wireless communications standard or a network card which supports a wired network connection. The network card may establish a network connection with a remote device and the like devices through a wireless or wired method. In an embodiment of the invention, the driver of the network card 102, for example, complies with the Network Driver Interface Specification (NDIS). However, the type of the driver of the network card 102 should not be construed as a limitation to the invention. For example, in another embodiment of the invention, the driver of the network card 102 may be any driver that supports a Wake on LAN (WOL) feature.

The input unit 104 is used to receive user's operations, for example, in the present embodiment, the input unit 104 may be a power button, but is not limited thereto. For example, in another embodiment, the input unit 104 may be an external or built-in keyboard or mouse of the electronic apparatus 100.

The storage unit 106 may be any type of fixed or movable random access memory (RAM), read-only memory (ROM), flash memory, solid state drive (SSD) or similar component or a combination of the above components. In the present embodiment, the storage unit 106 is used to record the software program of an input event filtering module 110 and a wake-up module 120. The storage unit 106 in the present embodiment is not restricted to a single storage unit, and each of the above software modules may be stored separately in two or more similar or dissimilar types of storage devices.

The processor 108 is coupled to the network card 102, the input unit 104 and the storage unit 106. The processor 108 may be a single-core or multi-core central processing unit (CPU), or a programmable microprocessor for general purpose or special purpose, a digital signal processor (DSP), a programmable controller, an application specific integrated circuit (ASIC) or other similar devices or a combination of the above devices. In the present embodiment, the processor 108 is used to access and execute the modules recorded in the above storage unit 106, so as to realize the wake-up method of the electronic apparatus of the present embodiment of the invention. The processor 108 of the present embodiment is not limited to a single processing component, and may also be two or more processor components implemented jointly.

Figure 2:
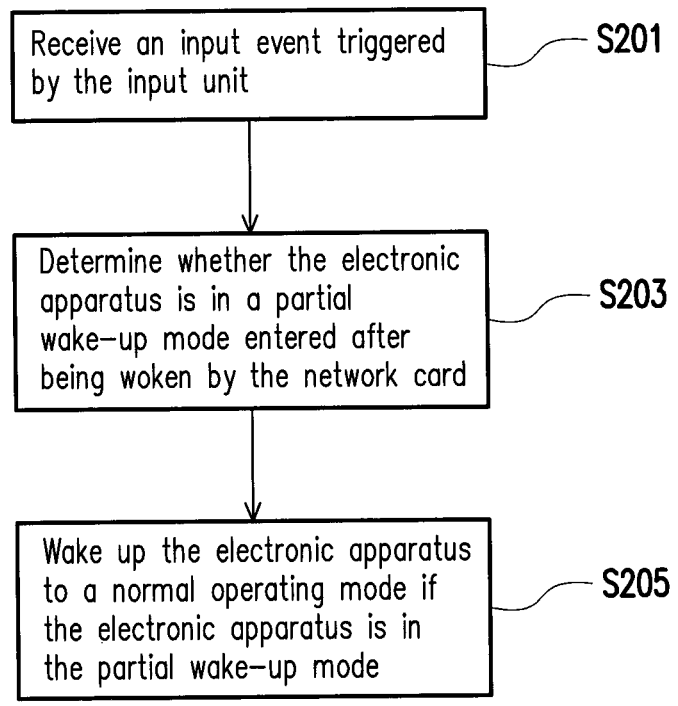
FIG. 2 is a flow diagram illustrating a wake-up method of an electronic apparatus according to an embodiment of the invention.

FIG. 2 is a flow diagram illustrating a wake-up method of an electronic apparatus according to an embodiment of the invention. Referring to FIG. 1 and FIG. 2, the method of the present embodiment is adapted for the above electronic apparatus 100, and the detailed steps of the method of the present embodiment will be described below accompanied by the components of the electronic apparatus 100 of FIG. 1.

First, the input event filtering module 110 receives an input event triggered by the input unit 104 (step S201). In the present embodiment, if the input unit 104 is a power button, the input event filtering module 110 may trigger an interrupt event to the wake-up module 120 after receiving the input event triggered by the input unit 104.

Next, the wake-up module 120 receives the above interrupt event from the input event filtering module 110, and determines whether the electronic apparatus 100 is in a partial wake-up mode entered after being woken up by the network card 102 (step S203). After receiving an interrupt event, the wake-up module 120 obtains wake-up information from the driver of the network card 102, and accordingly determines whether the electronic apparatus 100 is in a partial wake-up mode. More specifically, in the partial wake-up mode entered after being woken up by the network card 102, the electronic apparatus 100 only wakes up components necessary for a remote device accessing data of the electronic apparatus 100 through the network card. The necessary components include the processor, the network card, the memory or the hard drive, or a combination thereof. In other words, under this mode, the electronic apparatus 100 is allowed for a remote device to access data, and a part of the equipments (for example, a screen, a speaker, a CD-ROM and the like) in the electronic apparatus 100 is still in a sleep state or a shutdown state for saving power.

Particularly, in the present embodiment, the above interrupt event is a Windows Management Instrumentation (WMI) event. WMI is a core windows management technology developed by Microsoft, and the user may manage local electronic devices and remote devices via using the WMI, so as to obtain internal status information of local electronic devices and remote devices. For example, WMI may provide services such as starting a job on a remote device, obtaining a list of installed programs on a host or a remote computer, setting a task to be executed on a particular date and time and querying Windows event logs of a host or a remote device. For example, in the present embodiment, when receiving a WMI event, the wake-up module 120 obtains the wake-up information corresponding to the wake-up state of the electronic apparatus 100 from the network card 102 of the electronic apparatus 100. Based on this, the wake-up module 120 may learn whether the electronic apparatus 100 is in a partial wake-up mode according to the wake-up information.

Then, if the wake-up module 120 learns that the electronic apparatus 100 is in a partial wake-up mode according to the wake-up information, the wake-up module 120 wakes up the electronic apparatus 100 to a normal operating mode (step S205). Here, the normal operating mode is, for example, an S0 state defined in the Advanced Configuration and Power Interface (ACPI) standard. Under the normal operating mode, all the equipments and components of the electronic apparatus 100 are enabled, and the operating system and the application programs are also executed by the processor 108. In other words, besides the processor, the network card, the memory or the hard drive or a combination thereof of the electronic apparatus 100, other equipments and components of the electronic apparatus 100 (for example, screen, speaker and CD-ROM) are all woken up under the normal operating mode.

It should be noted, since in the present embodiment, the input unit 104 is a power button, when the wake-up module 120 learns the electronic apparatus 100 is not in a partial wake up mode according to the obtained wake-up information, the wake-up module 120 requests the input event filtering module 110 to transmit a control code (e.g. an IO control code) of the power button to the power management interface of the electronic apparatus 100, so as to allow the electronic apparatus 100 to execute the event corresponding to the power button. Here, the power management interface is an ACPI, and that is to say, the electronic apparatus 100 executes the event corresponding to the power button according to the ACPI and the settings of the user. For example, the electronic apparatus 100 enters a sleep mode, a shutdown mode, or a normal operating mode or takes no action.

In addition, in another embodiment, the input unit 104 may be a keyboard or mouse. In this case, the wake-up module 120 intercepts the input event triggered by the keyboard or mouse. In other words, the input event triggered by the keyboard or mouse is received by the wake-up module 120. When the wake-up module 120 receives an input event triggered by the keyboard or mouse, the wake-up module 120 executes the above step of determining whether the electronic apparatus 100 is in the partial wake-up mode entered after being woken up by network card 102 (Step S203). The details of the step are not repeated herein. If the wake-up module 120 determines the electronic apparatus 100 is in the partial wake-up mode, the wake-up module 120 directly wakes up the electronic apparatus 100 to a normal operating mode. On the other hand, if the wake-up module 120 determines that the electronic apparatus 100 is not in the partial wake-up mode, the wake-up module 120 executes the event corresponding to the mouse or keyboard or takes no action. Accordingly, the electronic apparatus 100 enters the corresponding state or continues to be in the current state according to TABLE (2) below.

Referring to TABLE (2), as described above, the states of a computer include a partial wake-up state corresponding to the above partial wake-up mode, a display off state, a sleep state, a hibernate state, a shutdown state and the like. The outcomes of executing the wake-up events triggered by input units corresponding to different states are different. Particularly, in the partial wake-up state, through the wake-up method of the electronic apparatus of the invention, when a user issues a wake-up event, for example, pressing the power button, keying on the keyboard or clicking on the mouse, the wake-up module 120 of the electronic apparatus 100 executes an operation of waking up the electronic apparatus 100 to a normal operating mode. Accordingly, the user may obtain an expected result when he/she executes a wake-up event under the partial wake-up state.

TABLE 2

| State | Input Unit | | |
|---|---|---|---|
| | Power Button | Keyboard | Mouse |
| Partial Wake-Up State | Wake up to Normal State | Wake up to Normal State | Wake up to Normal State |
| Display Off State | Event corresponding to power button | Display On | Not Applicable |
| Sleep State | Wake up to Normal State | Wake up to Normal State | Wake up to Normal State |
| Hibernate State | Wake up to Normal State | Not Applicable | Not Applicable |
| Shutdown State | Wake up to Normal State | Not Applicable | Not Applicable |

Figure 3:
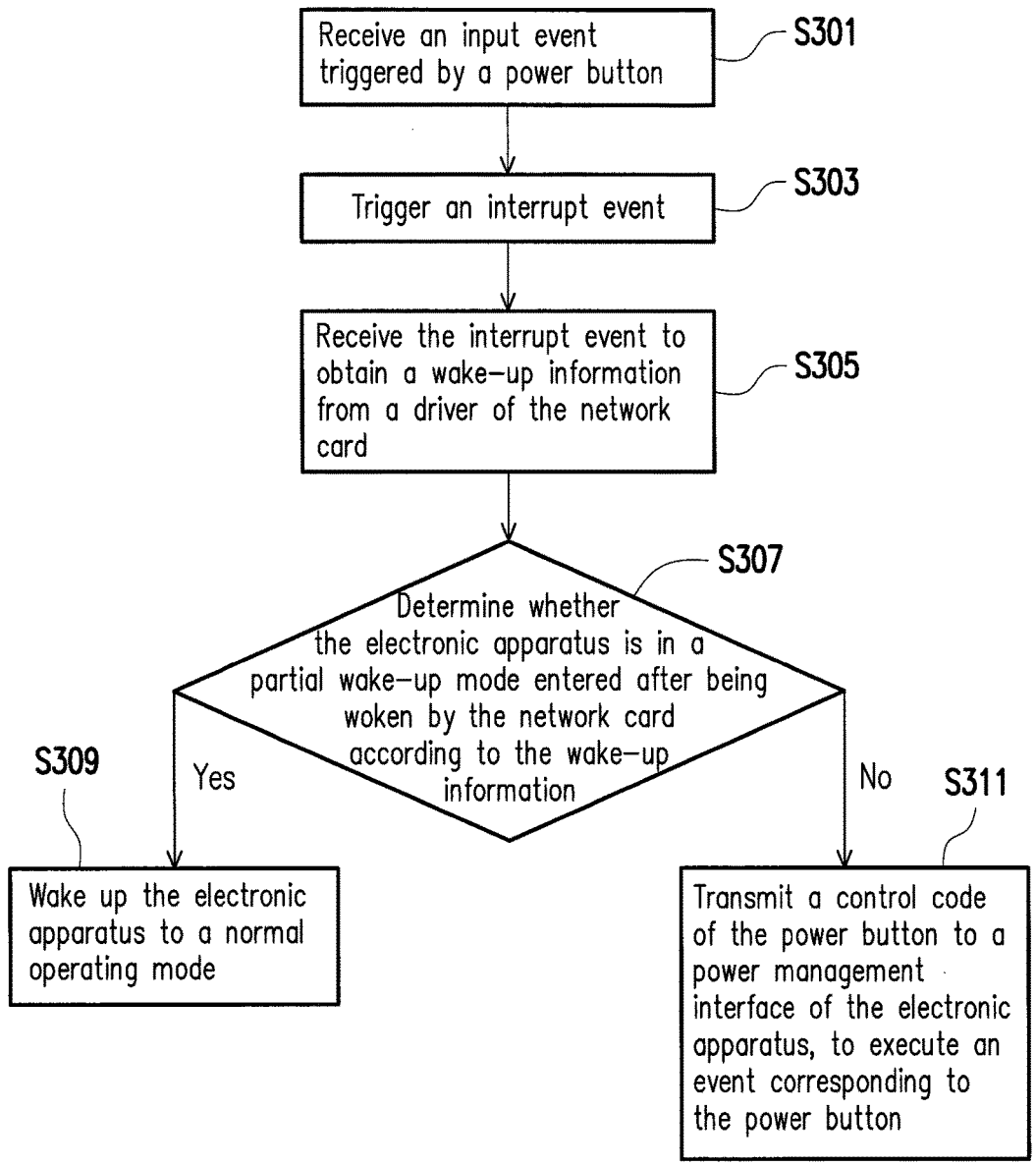
FIG. 3 is a flow diagram illustrating a wake-up method of an electronic apparatus based on an input event triggered by a power button according an embodiment of the invention.

FIG. 3 is a flow diagram illustrating a wake-up method of an electronic apparatus based on an input event triggered by a power button according an embodiment of the invention.

Referring to FIG. 3, in the step S301, the input event filtering module 110 receives an input event triggered by a power button.

In the step S303, the input event filtering module 110 triggers an interrupt event after receiving the input event triggered by the power button. Here, the interrupt event is a WMI event.

In the step S305, the wake-up module 120 receives the interrupt event, and accordingly obtains wake-up information from the driver of the network card. The driver of the network card complies with NDIS.

In the step S307, the wake-up module 120 determines whether the electronic apparatus 100 is in a partial wake-up mode entered after being woken up by the network card according to the wake-up information.

If the electronic apparatus 100 is in the partial wake-up mode, in the step S309, the wake-up module 120 wakes up the electronic apparatus 100 to a normal operating mode.

On the other hand, if the electronic apparatus 100 is not in the partial wake-up mode, in step S311, the wake-up module 120 requests the input event filtering module 110 to transmit a control code (e.g. an IO control code) of the power button to a power management interface of the electronic apparatus 100, so as to execute an event corresponding to the power button. The power management interface includes an ACPI.

Each step in FIG. 3 is described in above description, and therefore is not repeated herein. It is noted that each step in FIG. 3 may be implemented with a plurality of program codes or a circuit, and is not limited thereto. In addition, the method of FIG. 3 may be implemented accompanied with aforesaid embodiments, and may be implemented independently, which is not limited herein.

Figure 4:
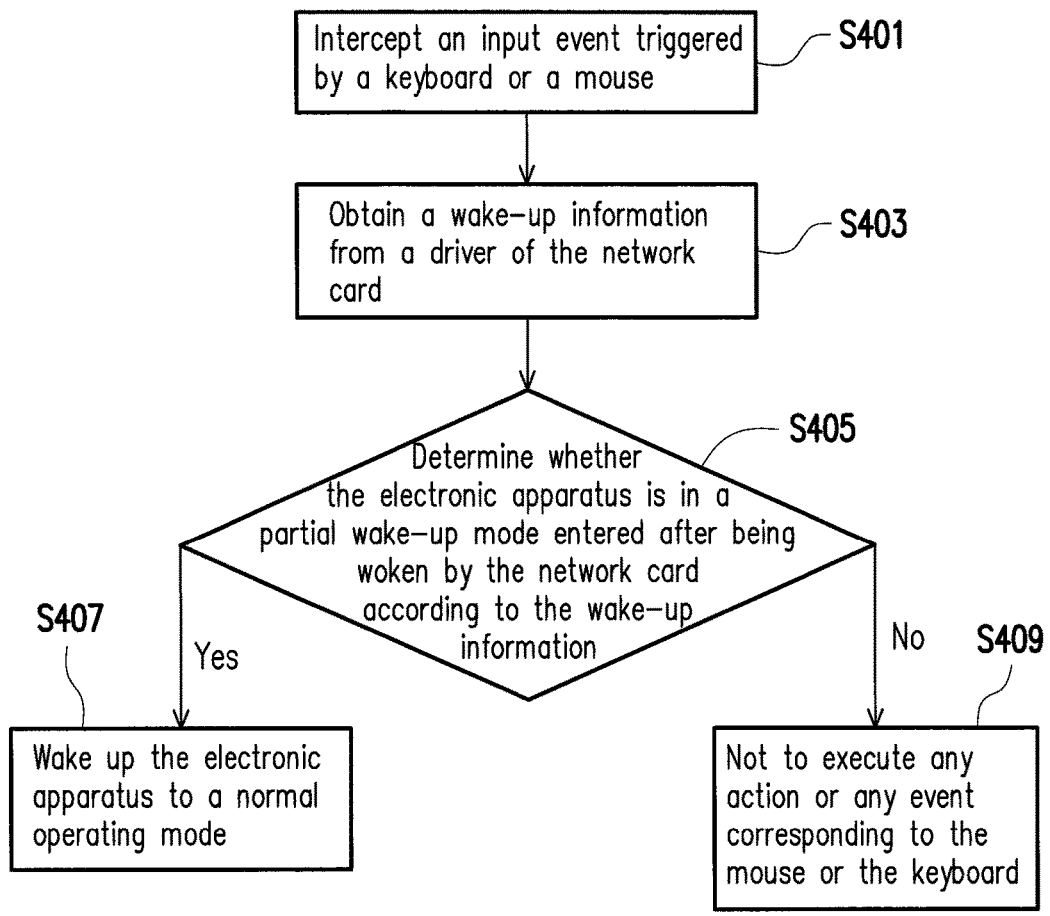
FIG. 4 is a flow diagram illustrating a wake-up method of an electronic apparatus based on an input event triggered by a mouse or a keyboard according to an embodiment of the invention.

FIG. 4 is a flow diagram illustrating a wake-up method of an electronic apparatus based on an input event triggered by a mouse or a keyboard according to an embodiment of the invention.

Referring to FIG. 4, in the step S401, the wake-up module 120 intercepts an input event triggered by a mouse or a keyboard.

In the step of S403, the wake-up module 120 obtains a wake-up information from the driver of the network card after receiving an input event triggered by the mouse or the keyboard.

In the step S405, the wake-up module 120 determines whether the electronic apparatus 100 is in a partial wake-up mode entered after being woken up by the network card according to the wake-up information.

If the electronic apparatus 100 is in the partial wake-up mode, in the step S407, the wake-up module 120 wakes up the electronic apparatus 100 to a normal operating mode.

If the electronic apparatus 100 is not in the partial wake-up mode, in the step S409, the wake-up module 120 does not execute any action or any event corresponding to the mouse or the keyboard.

Each step in FIG. 4 is described in above description, and therefore is not repeated herein It is noted that each step in FIG. 4 may be implemented with a plurality of program codes or a circuit, and is not limited thereto. In addition, the method of FIG. 4 may be implemented accompanied with aforesaid embodiments, and may be implemented independently, which is not limited herein.

In summary, the electronic apparatus and the wake-up method thereof provided by the invention determine whether the electronic apparatus has already been woken up by the network card so as to correctly wake up the electronic apparatus to a normal operating mode after receiving an input event, thus preventing a result not expected by the user. Based on this, user experience on operating the electronic apparatus is effectively improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wake-up method of an electronic apparatus, adapted for an electronic apparatus having an input unit and a network card, comprising:
    receiving an input event triggered by the input unit to trigger an interrupt event, wherein the input unit is a power button;
    receiving the interrupt event, obtaining a wake-up information from a driver of the network card, and accordingly determining whether the electronic apparatus is in a partial wake-up mode entered after being woken up by the network card; and
    waking up the electronic apparatus to a normal operating mode if the electronic apparatus is in the partial wake-up mode.

2. The wake-up method of an electronic apparatus as claimed in claim 1, wherein the step of determining whether the electronic apparatus is in the partial wake-up mode entered after being woken up by the network card further comprises:
    transmitting a control code of the power button to a power management interface of the electronic apparatus for executing an event corresponding to the power button if the electronic apparatus is not in the partial wake-up mode.

3. The wake-up method of an electronic apparatus as claimed in claim 1, wherein the input unit is a keyboard or a mouse, and after the step of receiving the input event triggered by the input unit, the method further comprises:
    directly waking up the electronic apparatus to the normal operating mode.

4. The wake-up method of an electronic apparatus as claimed in claim 1, wherein in the partial wake-up mode, the electronic apparatus only wakes up components necessary for a remote device accessing data of the electronic apparatus through the network card, and the necessary components comprise one or a combination of a processor, the network card, a memory and a hard drive.

5. An electronic apparatus, comprising:
    a network card;
    an input unit, wherein the input unit is a power button;
    a storage unit, storing a plurality of modules; and
    a processor, coupled to the network card, the input unit and the storage unit, loading and executing the modules stored in the storage unit, the modules comprising:
        an input event filtering module, receiving an input event triggered by the input unit to trigger an interrupt event; and
        a wake-up module, receiving the interrupt event, obtaining a wake-up information from a driver of the network card, and accordingly determining whether the electronic apparatus is in a partial wake-up mode entered after being woken up by the network card, wherein the wake-up module wakes up the electronic apparatus to a normal operating mode if the electronic apparatus is in the partial wake-up mode.

6. The electronic apparatus as claimed in claim 5, wherein if the electronic apparatus is not in the partial wake-up mode, the wake-up module requests the input event filtering module to transmit a control code of the power button to a power management interface of the electronic apparatus for executing an event corresponding to the power button.

7. The electronic apparatus as claimed in claim 5, wherein the input unit is a keyboard or a mouse, wherein the wake-up module directly wakes up the electronic apparatus to the normal operating mode after receiving the input event triggered by the input unit.

8. The electronic apparatus as claimed in claim 5, wherein in the partial wake-up mode, the electronic apparatus only wakes up components necessary for a remote device accessing data of the electronic apparatus through the network card, and the necessary components comprises one or a combination of a processor, the network card, a memory and a hard drive.

* * * * *